United States Patent [19]

Egee et al.

[11] 4,388,332

[45] Jun. 14, 1983

[54] HEAT TREATMENT TEMPERATURE INDICATING FOOD PACKAGE AND PROCESS FOR PROVIDING SAME

[75] Inventors: Walter W. Egee, Wallingford, Pa.; David A. Rickansrud, Voorhees, N.J.

[73] Assignee: Campbell Soup Company, Camden, N.J.

[21] Appl. No.: 302,458

[22] Filed: Sep. 15, 1981

[51] Int. Cl.$^{3}$ .................... G01K 1/14; G01K 11/12; B65B 25/00; B65B 55/14

[52] U.S. Cl. .................................. 426/88; 426/383; 426/412; 99/342; 116/216; 422/119; 374/102

[58] Field of Search ................... 426/88, 87, 383, 412, 426/232; 99/342; 73/356, 343 B, 352; 116/207, 216; 248/94, 95, 99, 101; 422/119; 206/806; 229/62

[56] References Cited

U.S. PATENT DOCUMENTS

| | | | |
|---|---|---|---|
| 1,668,767 | 5/1928 | Hanson | 73/356 |
| 2,222,067 | 11/1940 | Chaney et al. | 73/356 |
| 2,460,215 | 1/1949 | Chase | 426/88 |
| 2,826,073 | 3/1958 | Huyck et al. | 73/356 |
| 2,981,990 | 5/1961 | Balderree | 229/62 |
| 3,245,198 | 4/1966 | Schmied | 426/412 |
| 3,348,595 | 10/1967 | Stevens | 229/62 |
| 3,380,833 | 4/1968 | Turner | 426/332 |
| 3,479,876 | 11/1969 | Kliewer | 426/88 |
| 3,568,627 | 3/1971 | Selinger et al. | 73/356 |
| 3,667,916 | 6/1972 | Sliva et al. | 73/356 |
| 3,754,465 | 8/1973 | Romito et al. | 426/88 |
| 3,769,932 | 11/1973 | Romito et al. | 99/342 |
| 3,819,089 | 6/1974 | Scales | 248/95 |
| 3,996,802 | 12/1976 | Smith | 73/356 |
| 3,999,946 | 12/1976 | Patel et al. | 426/88 |
| 4,177,620 | 12/1979 | Daly et al. | 426/87 |
| 4,292,714 | 10/1981 | Walker | 229/62 |
| 4,340,610 | 7/1982 | Nioras | 426/88 |

FOREIGN PATENT DOCUMENTS

| | | | |
|---|---|---|---|
| 2426249 | 5/1978 | France | 73/356 |
| 1263266 | 2/1972 | United Kingdom . | |

OTHER PUBLICATIONS

The Steriliz. of Food in Pouches–Critical Parameters for Still Processing, Berry, Hew, 3/79.
Food Engineering, 1/56, pp. 92, 93, 140, 143, Nelson et al.
Package Engineering, vol. 5 #7, 7/60, Wornick et al.

*Primary Examiner*—Steven L. Weinstein
*Attorney, Agent, or Firm*—Albert L. Free

[57] ABSTRACT

The fact that meatballs in a casing have been heated to a predetermined temperature sufficient to inactivate the virus of foot and mouth disease is permanently indicated by using a holder device to position a temperature recorder at the thermal "cold-spot" of the mass of meatballs. The temperature recorder is preferably of the type which permanently changes color when heated to the desired predetermined temperature, and the holder may be an apertured disc to which the temperature recorder is secured by an enveloping netting. An import inspector will then be able to ascertain that the meat has been previously heated to the desired temperature by observing the color of the temperature recorder.

7 Claims, 5 Drawing Figures

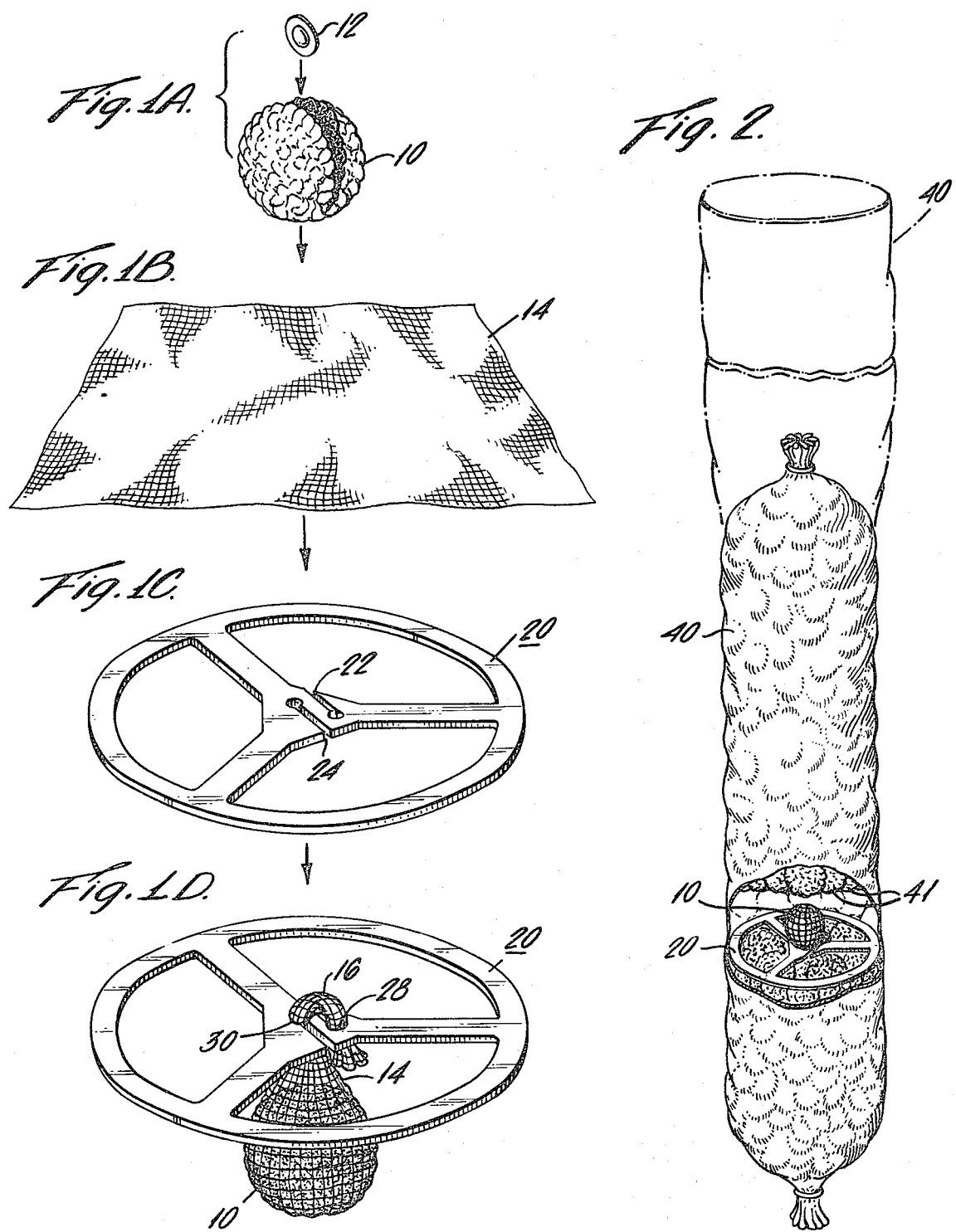

HEAT TREATMENT TEMPERATURE INDICATING FOOD PACKAGE AND PROCESS FOR PROVIDING SAME

This invention relates to a new and useful food package, and to a new and useful process for providing same; more particularly, in its preferred form it relates especially to a food package and food processing procedure by which packaged food can be heat treated and the fact that such heat treatment has successfully been performed and can easily be determined later by inspection of the package and its contents.

The invention will be described particularly with regard to the problem of assuring freedom of certain food products from harmful viruses, such as foot and mouth disease virus which could be present in meat products imported from countries where the virus is prevalent; this virus may be present in raw, red beef or beef products made therefrom, for example in ground raw beef or raw meatballs. Accordingly, the U.S. Government does not allow raw beef to be imported into the United States and various other countries have a similar policy.

Such viruses can be inactivated by heating the product to a predetermined temperature, which has been proven by experiment to inactivate the virus, and thereafter handling the product in a manner which will prevent recontamination with the virus. To comply with government regulations, it is necessary to do this in the affected country, and then import the heat-treated meat. However, the U.S. Government will not permit such importation unless it has reasonable assurance that effective heat treatment has taken place, and that its import inspectors in the United States can obtain such assurance by a relatively simple inspection of the meat product. In the case of ground beef, tissues (such as, lymph node, bone marrow, and/or blood clots) that may confer increased heat resistance to the foot and mouth disease virus could be mixed with skeletal muscle during the grinding process. Consequently, mere visual inspection of the product is not sufficient to assure an inspector that an effective heat treatment has been performed.

The method of the present invention provides for such heat treatment and sterile handling, and also provides a convenient indication demonstrating to an inspector that all of the meat in the package has in fact been processed as described above, e.g. heated sufficiently to destroy the virus and meet health standards.

According to the invention, the food product is placed into cooking containers such as cooking bags, casings or similar flexible or semi-rigid packages, and the product cooked in the package until the minimum required treatment temperature has been reached by all of the food product in the container; for foot and mouth disease, a temperature somewhat in excess of 200° F. is preferred for ground beef products. After the product has been heat treated, the food-containing package is preferably cooled, frozen, and then shipped to its destination, for example to the United States where import inspectors may examine it at the port-of-entry.

In order to provide a clear indication that the food product has in fact been subjected to the desired heat treatment, a temperature-recording device, such as a so-called "color chip", is placed and held at the thermal center or "cold-spot" of the food prior to the heating process, i.e. at the position in the food which is at the lowest temperature during heating and therefore is the last to achieve the desired minimum treatment temperature. The temperature-recording device responds to heating above the predetermined treatment temperature by irreversibly changing its visual appearance, preferably by dramatically and permanently changing its color. In the case of meatballs, the temperature-recording device is preferably located within and at the center of one of the meatballs. In order to hold it in the desired position at the thermal cold-spot, and to make it readily observable and retrievable by an inspector, the temperature-recording device is secured to a holder device, which may be a plastic disc much larger in size than the temperature-recording device. In one preferred embodiment, the temperature-recording device is inserted within a meatball, the meatball wrapped in a netting, the netting closed to provide a neck portion thereon, and the neck portion secured to the holding device. To accomplish this conveniently, the holder device may be provided with a pair of slots through which the neck of the mesh is threaded, or into which it is slid edgewise. However, the temperature-recorder may be associated with the food product in other ways, particularly where the food is comminuted meat not formed into balls.

The relatively large holder device not only makes it easy for an inspector to find and check the temperature-recording device, but makes it also easy for those using the product to find the temperature-recording device and remove it from the food; in the event that this is not done, the disc will, in any event, be prevented by its size from entering end-user equipment, such as a filler for example.

Importantly, the holder assures that the temperature-recorder is located and held during the heating process at the position in the bag which is the last to reach the predetermined treatment temperature, i.e. at the thermal cold-spot.

The thermal cold-spot of the food-containing packages is preferably determined by applying the heat-treatment to several representative packages while measuring the temperature at spaced points in the food product, noting the position in the food product which is last to reach the desired treatment temperature. The temperature-measuring device is then located at the corresponding position in other substantially identical packages of food product during their subsequent heat treatment.

Where the food product pieces are very small, or the food product is inconvenient to work, the temperature-recording device can, for example, be sandwiched between two holder devices or otherwise fastened directly to the holder device without the use of the netting.

BRIEF DESCRIPTION OF FIGURES

These and other objects and features of the invention will be more readily understood from a consideration of the following detailed description of specific embodiments, with reference to the accompanying figures, in which:

FIGS. 1A through 1D are perspective views showing the process of assembling the temperature-recording device in a meatball, the positioning of the meatball within a netting, and the securing of the netting to a disc-type holder device; and FIG. 2 is a perspective view illustrating in full line the final assembly of food product, temperature-recording device and holder device in a completed package, and showing in broken line the configuration of the casing prior to closure thereof.

DETAILED DESCRIPTION OF SPECIFIC EMBODIMENTS

Referring now to the embodiment of the invention illustrated in the drawings by way of example only, there is shown in FIG. 1A a beef meatball 10 which has been split open to enable the insertion therein of a temperature-recording device in the form of a color chip 12 which irreversibly changes color when heated to a predetermined temperature. The meatball is closed about the inserted temperature-recording device and placed in the center of a nylon netting 14, the netting then being folded in a pouch-like configuration to envelop the meatball and to form a neck portion 16 in the netting. A holder device in the form of holder disc 20 is also provided, which contains a pair of slots 22 and 24 through which the neck of the netting is threaded in succession, as shown at 28 and 30.

The container in this example comprises a generally cylindrical casing 40, initially closed at its lower end, and into which the meatballs such as 41 are dumped to fill the casing to a predetermined height. The holder disc with the netting containing the meatball and color chip is then placed horizontally in the casing on top of the previously inserted mass of meatballs, with the chip-containing meatball facing upwardly, at the thermal cold-spot of the portion of the casing to be filled. Filling of the casing to the desired height is then completed, and the casing is preferably filled with water sufficiently to cover the meatballs, as has been found helpful in preserving their generally spherical configuration.

The assembly just described is subjected to heating so as to cause the temperature at the color chip, and throughout the food product, to rise to a temperature sufficient to inactivate the virus of foot and mouth disease, preferably somewhat in excess of 200° F.; typically, the color chip may be selected to change its color drastically at about 205° F., thus allowing some tolerance. The casing is closed tightly at its top, preferably either before heating or promptly thereafter. Heating is preferably accomplished by dipping the food-containing casing into boiling water for a time previously determined to be sufficient for the thermal center to reach the desired temperature. After heating, the casing and contents are preferably cooled to about room temperature by immersing at least the food-containing portion of the container into cool water, the water in the casing poured off, and the casing sealed by applying a clip around the casing just above the food.

The completed product is preferably frozen for transit to an import station where, if desired, the import inspector may observe the holder disc through the transparent casing, cut open the casing and food product, open the netting, and examine the color chip to see that it has in fact turned color, indicating that proper heat treatment of the meat has taken place. The holder disc 20 greatly facilitates this locating and uncovering of the color chip. Furthermore, if the package is one which is not opened by an inspector, but is merely sent on to the end user, when the material contained therein is dumped into a filler the holder disc will be readily apparent and can be manually removed; if not removed, it will be prevented from entering any filler machine because of its size.

In normal use, an inspector may randomly sample one or a few of the complete packages from a batch comprising a large number of such packages, relying upon the changed color of the temperature recorded in the one or more samples as an indication that all packages in the batch have been properly heat-treated and processed. To do this with a frozen product, he will normally cut out the portion of the package containing the holder device and temperature-recording device using a power saw, and then thaw the cutout portion to retrieve and examine the temperature-recording device.

In this way not only is the food product treated so as to inactivate the harmful virus, but there is also provided a simple procedure enabling the import inspector to inspect the package to determine that the food therein has in fact been properly treated.

In one typical embodiment the temperature-recording device may be one identified by the trademark HOTSPOT and sold by TELATEMP Corp., of Fullerton, CA. The meatballs may be of ground raw beef, the netting 14 may be of nylon, the holder device 20 may be of inert plastic material, and the casing 40 may be of nylon sheeting impervious to air and moisture. The open casing may be about 33 inches in length and about 4½" in diameter; when filled and closed, the casing may be about 27 inches long. Top and bottom closures for the casing may be provided by crimped metal clips.

While the casing is preferably transparent or at least reasonably translucent so that an inspector can see the holding device through the casing, the presence of the holder device can be ascertained even though the holder is not visible by cutting into the package at about the expected position of the holder disc, and such use of the system and package will have utility in some applications. Further, in some cases and particularly in connection with heat treatment for purposes other than inactivating foot and mouth disease virus, the treatment and packaging may be done in the United States, and the sampling performed also in the United States, or elsewhere. In addition, the use of netting as the chip holder is not essential in all cases; although the openings in the netting are useful in permitting penetration of the heat to the temperature-recorder and the meatball containing it, in some cases a non-porous covering may be used, or the temperature-recorder may be positioned next to the holder device by entirely different means, for example by placing the meatball between two non-apertured marker discs in the case of finely-divided food products. It is also possible to insert the temperature-recording device into a slit made in a large chunk of meat, preferably then closing and covering the slot and associating a holder with it.

In the preferred embodiment shown, the holder disc is apertured so that only a minor part of the area of the disc is occupied by the disc material. Thus as shown it has an outer circular portion selected to fit closely to the inner periphery of the cylindrical casing and hold the disc and chip from lateral movement, and thin spokes forming a web for supporting the central disc-securing portion of the disc. The large open portions of the disc permit convection of the water in the casing to facilitate even heat distribution, and also permit packing of the layer of meatballs above the disc against the layer of meatballs immediately below the disc, to provide uniformity of packing. The disc can be inexpensively made by stamping from a thin solid disc of plastic.

As noted above, in order to assure heating of all of the meat to the desired temperature, the temperature-recording chip should be placed at the thermal cold-spot of the package for the type of heating process used, that is, at the position in the meat which is last to reach the desired treatment temperature. This position will vary depending upon the type of heating process used and on the size, shape and type of casing and to some extent on the nature of the food product. For any given type of casing, product and heating process, a position in the casing can be determined at which attainment of the specified treatment temperature is a reliable indication that all of the meat at other locations in the casing has reached or exceeded the desired treatment temperature. It is at this location that the chip is to be placed and held.

To determine such a location, several test runs of the heating process may be made, with all parameters just as they will be during regular commercial use of the process, but with thermocouples placed along the vertical center line of the food in the casing. By noting the temperature at each thermocouple as a function of time from the instant when the casing, food and thermocouples are first placed in the boiling cook water, data such as set forth in Table I hereof can be obtained and averaged for the several test runs. In this example, it can be seen that when the meat at the thermocouple located 7 inches from the bottom of the meat-filled tube reaches 205° F., all meat in the tube will have reached or exceeded that temperature, and accordingly the temperature-recording chip may properly be located along the package axis at a position 7 inches from the bottom during the subsequent identical heat treatment of identical meat-containing casings.

In Table I hereof, it will be understood that the left-hand column represents minutes of time measured from first immersion of the casing and meat in the boiling water to a depth such that the top of the water is above the level of the top of the meat. Successive columns to the right of the "minute" column represent the temperature obtained at the indicated times at points in the meat on the vertical axis of the casing spaced above the bottom of the casing by the distances shown at the top of the columns. The asterisks identify the times at which the temperature of the meat at the various positions first exceeds 205° F. These data were obtained with the top of the casing open, and show that at the end of 13 minutes of heating in boiling water all parts of the meat will have reached a temperature of at least 205° F. In this example the casing during heat treatment contained about 10 pounds of meatballs and 5.5 pounds of water, the meatballs extending to a level about 17 inches above the closed bottom of the casing.

TABLE I

| Minutes from Start | Temperature in °F. Distance of Thermocouple from Tube Bottom (Inches) | | | | | | | |
|---|---|---|---|---|---|---|---|---|
| | 3 | 4 | 6 | 7 | 8 | 9 | 14 | 17 | Top |
| 0 | 47 | 46 | 47 | 60 | 60 | 52 | 57 | 58 | 66 |
| 1 | 54 | 67 | 61 | 70 | 70 | 66 | 78 | 104 | 96 |
| 2 | 64 | 94 | 77 | 85 | 85 | 84 | 109 | 130 | 140 |
| 3 | 91 | 119 | 106 | 109 | 107 | 126 | 128 | 153 | 169 |
| 4 | 116 | 144 | 131 | 132 | 130 | 150 | 153 | 168 | 191 |
| 5 | 140 | 164 | 152 | 152 | 155 | 165 | 168 | 180 | 200 |
| 6 | 160 | 176 | 169 | 166 | 167 | 179 | 181 | 187 | 204 |
| 7 | 177 | 186 | 180 | 172 | 176 | 189 | 191 | 199 | 206* |
| 8 | 192 | 196 | 190 | 186 | 189 | 196 | 198 | 204 | 207 |
| 9 | 201 | 201 | 197 | 193 | 196 | 201 | 203 | 207* | 208 |
| 10 | 206* | 204 | 200 | 198 | 200 | 203 | 206* | 208 | 208 |
| 11 | 207 | 206* | 203 | 201 | 203 | 205* | 208 | 210 | — |
| 12 | 207 | 207 | 205* | 204 | 205* | 207 | 209 | 210 | — |
| 13 | 209 | 208 | 206 | 206* | 207 | 208 | 209 | 210 | — |
| 14 | 209 | 209 | 208 | 208 | 209 | 209 | 210 | — | — |

TABLE I-continued

| Minutes from Start | Temperature in °F. Distance of Thermocouple from Tube Bottom (Inches) | | | | | | | |
|---|---|---|---|---|---|---|---|---|
| | 3 | 4 | 6 | 7 | 8 | 9 | 14 | 17 | Top |
| 15 | 209 | 209 | 209 | 210 | 210 | 210 | 210 | — | — |

*Point at which thermocoupled meatball had reached the 205° F. minimum for cooking cut-off.

One successful sequence for steps for practicing the invention, especially as applied to meatballs, is to place the product in the casing, fill the casing with water to a level above the meatballs, heat the assembly by placing it in boiling water for the previously-determined treatment time, removing the casing and contents from the hot bath and cooling it to about room temperature, pouring off the water, closing the casing and freezing the closed casing and contents, in that order. However, removal of the water is not necessary in all cases, and closure can be provided prior to heating. While the water is very helpful in preserving meatball shape, with other foods such as ground meat not in ball form, the water need not be added to all.

Thus while the invention has been described with particular reference to specific embodiments thereof in the interest of complete definiteness, it will be understood that it may be embodied in a variety of forms diverse from those specifically shown and described, without departing from the spirit and scope of the invention as defined by the appended claims.

What is claimed is:

1. The method of treating and packaging ground meat, comprising:

placing entirely within a predetermined ball of said ground meat a wireless temperature-recorder device which changes its appearance permanently when heated to at least the temperature required to inactivate the virus of foot and mouth disease;

partially filling the bottom of a food container with ground meat similar to the meat of said predetermined ground meat ball, to a level just below the position of the thermal cold-spot of said container when said container is filled to a predetermined level with said ground meat;

securing said selected ground meat ball to and adjacent a thin, plastic, apertured disc-like holder which has edges adapted to fit inside and against the inner side walls of said container and which is adapted to lie flat on the top of said ground meat partially filling said container, in a predetermined position with said predetermined ground meat ball and said temperature recorder secured thereto adjacent one side thereof and substantially at said cold-spot, said securing of said selected ground meat ball comprising enveloping said selected ground meat ball in a thin flexible material and securing said material to said holder;

placing said holder, with said predetermined ground meat ball secured thereto, in said container transversely of said container and in said predetermined position;

thereafter filling said container with additional ground meat to said predetermined level and sealing it;

and heating said container and contents, before or after said sealing, to at least said temperature sufficient to inactivate the virus of foot and mouth disease, whereby said temperature-recording device provides a permanent record of said heating to said temperature.

2. The method of claim 1, comprising shipping said container and contents to a remote check point, and at said check point exposing said temperature recorder to enable observation of whether the ground meat has been previously heated sufficiently to inactivate the virus of foot and mouth disease.

3. The method of claim 1, wherein said thin flexible material is a netting.

4. A food-package assembly adapted to provide indication that it has been heated sufficiently to inactivate the virus of foot and mouth disease which may be present therein, comprising a moisture proof container, a mass of ground meat filling said container to a predetermined level, a temperature-recording device within said mass of meat, and an apertured holder for locating said temperature-recording device within said mass of meat, characterized in that:

said holder is of thin disc-like form and has a periphery fitting closely within and against the interior of the side walls of said container when said holder is positioned transversely of said container;

said temperature-recorder device being wireless and positioned entirely within a predetermined ball of said ground meat and said predetermined ball being secured to said holder adjacent one side thereof, said holder being positioned transversely of said container within said mass of ground meat to position said temperature-recording device substantially at the cold-spot of said mass, said ball of ground meat being enveloped in a thin flexible material and said material being secured to said holder; and said temperature-recording device being of a type which changes its appearance permanently when heated to a temperature at least as high as that required to inactivate the virus of foot and mouth disease.

5. The assembly of claim 4, wherein said flexible material comprises a netting enveloping said selected one of said pieces and secured to said holder.

6. The assembly of claim 5, wherein said holder is apertured to provide spoke-like portions supporting a central portion of said holder and said netting is secured to said central portion.

7. The assembly of claim 5, wherein said holder comprises one or more slots in said central portion for securing said netting.

* * * * *